(12) United States Patent
Hasenjäger et al.

(10) Patent No.: US 7,597,544 B2
(45) Date of Patent: Oct. 6, 2009

(54) BLADE OF AXIAL FLOW-TYPE ROTARY FLUID MACHINE

(75) Inventors: Martina Hasenjäger, Offenbach/Main (DE); Bernhard Sendhoff, Offenbach/Main (DE); Toyotaka Sonoda, Saitama (JP); Toshiyuki Arima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 421 days.

(21) Appl. No.: 11/294,372

(22) Filed: Dec. 6, 2005

(65) Prior Publication Data

US 2006/0275134 A1 Dec. 7, 2006

(30) Foreign Application Priority Data

Jun. 1, 2005 (DE) .................. 10 2005 025 213

(51) Int. Cl.
*F03B 3/12* (2006.01)

(52) U.S. Cl. ................. 416/242; 416/243; 416/DIG. 2; 416/DIG. 5

(58) Field of Classification Search .................. 416/62, 416/203, 243, 242, 235, DIG. 2, DIG. 5
See application file for complete search history.

(56) References Cited

U.S. PATENT DOCUMENTS 1,977,072 A * 10/1934 Lyman ...................... 416/202
5,492,448 A * 2/1996 Perry et al. ................... 416/62
6,116,856 A * 9/2000 Karadgy et al. ............. 416/203
2002/0085918 A1 * 7/2002 Olhofer et al. .......... 416/223 A

FOREIGN PATENT DOCUMENTS

JP 2002-138801 5/2002

* cited by examiner

*Primary Examiner*—Edward Look
*Assistant Examiner*—Aaron R Eastman
(74) *Attorney, Agent, or Firm*—Squire, Sanders & Dempsey L.L.P.

(57) ABSTRACT

A first bent portion bent toward an intrados and a second bent portion located in the rear of the first bent portion and bent toward an extrados are provided on a camber line on a trailing edge in the rear of 90% of a chord length of a turbine blade having an extremely low aspect ratio for an axial-flow turbine. The inclination of the camber line immediately in the rear of the second bent portion on the side of a blade root is substantially equal to the inclination of the camber line immediately in front of the first bent portion, and the curvature of the second bent portion is decreased from the side of the blade root toward a blade tip. As a result, a higher-pressure portion on the intrados which is a pressure surface of the turbine blade is displaced toward the trailing edge, and thus a secondary flow from the side of the blade tip toward the blade root can be suppressed, whereby a pressure loss particularly in the vicinity of the blade root can be suppressed to the minimum.

7 Claims, 11 Drawing Sheets baseline optimized

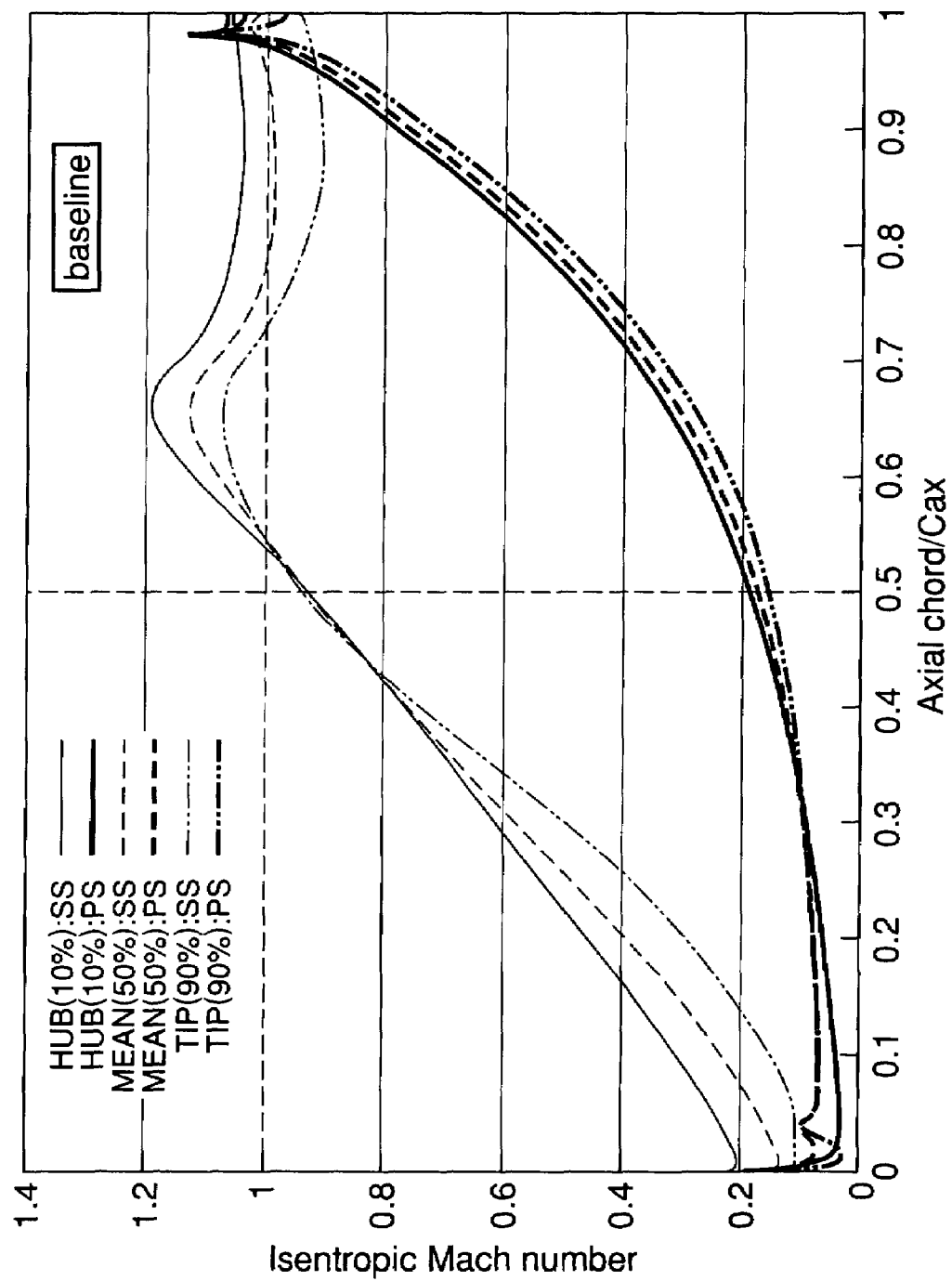

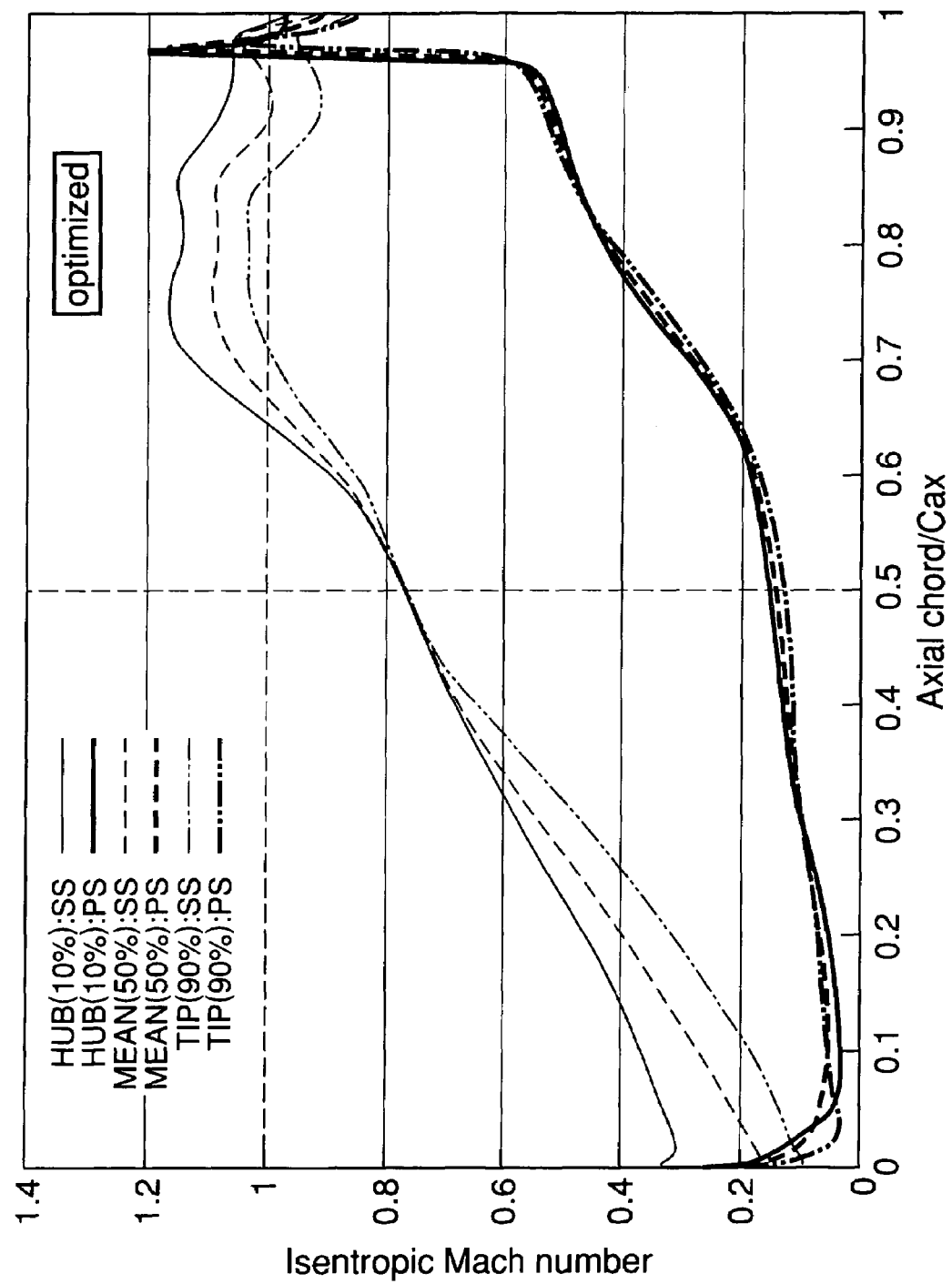

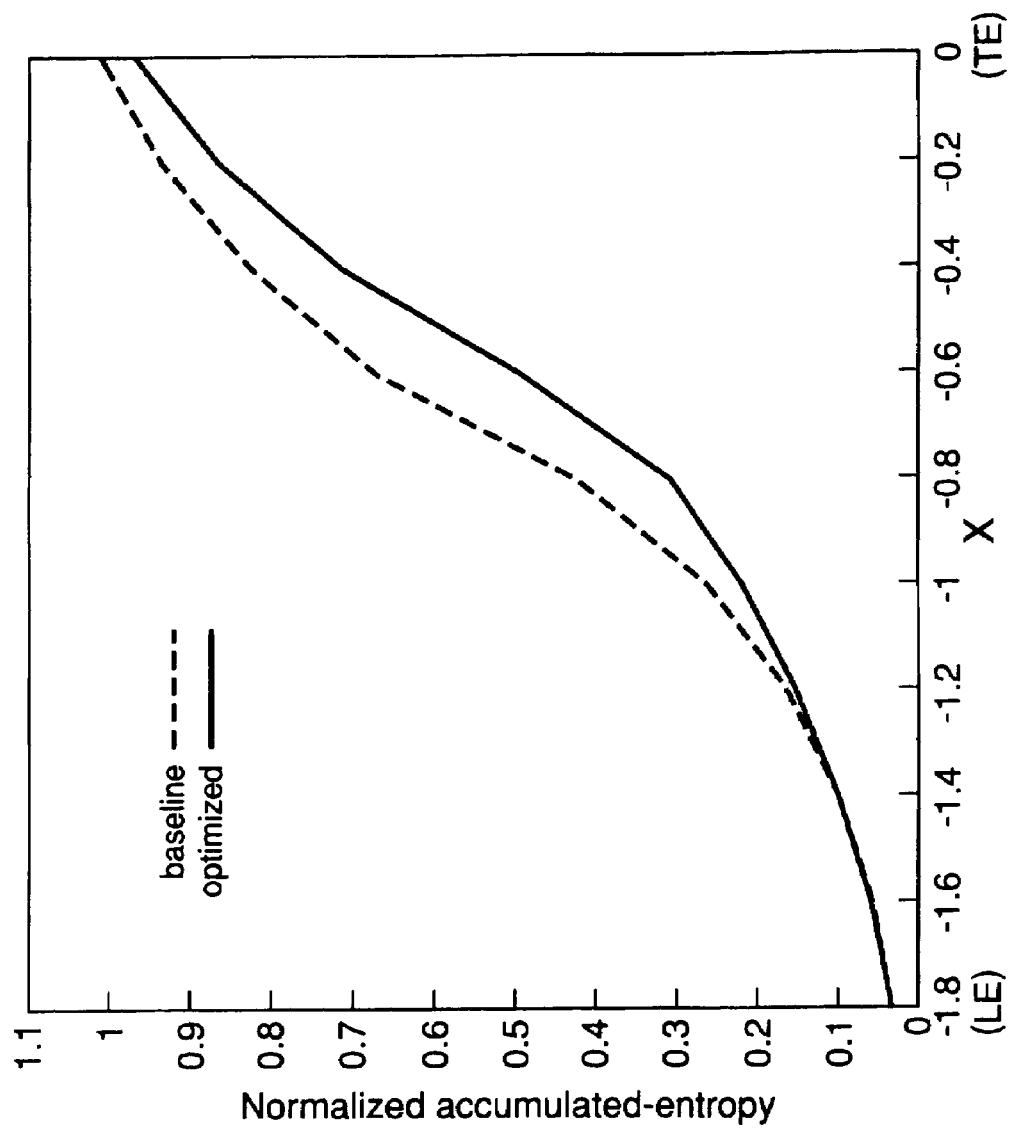

US 7,597,544 B2

BLADE OF AXIAL FLOW-TYPE ROTARY FLUID MACHINE

RELATED APPLICATION DATA

German priority application No. 10 2005 025 213.3, upon which the present application is based, is hereby incorporated in its entirety herein by reference.

BACKGROUND OF THE INVENTION

1. Field of the Invention

The present invention relates to a three-dimensional shape of a blade used in an axial-flow rotary fluid machine such as an axial-flow turbine and an axial-flow compressor, and particularly to a blade having an extremely small aspect ratio.

2. Description of the Related Art

An airfoil of a turbine blade of an axial-flow turbine described in Japanese Patent Application Laid-open No. 2002-138801 includes an inflection point between an upstream concave portion and a downstream convex portion in the rear of an 80% position on an intrados, so that a shock wave generated from the intrados of a trailing edge is dispersed into two components by the effect of the inflection point to weaken the respective shock wave components, thereby decreasing the energy loss generated due to the interference of these shock wave components with a boundary layer of an extrados of an adjacent turbine blade. In this blade airfoil, a camber line in the vicinity of the trailing edge is curved in an S-shape by the provision of the inflection point on the intrados in the vicinity of the trailing edge.

A turbine blade having a low aspect ratio has a significant tendency (a secondary flow) that the flow of a fluid along a blade surface is deflected from the side of a blade tip toward a blade root, resulting in a problem of an increased pressure loss in the blade. In the above-described conventional blade, however, a three-dimensional shape of the turbine blade, namely, a difference between the airfoil of the blade root and the airfoil of the blade tip is not taken into consideration, so that the pressure loss accompanying the secondary flow cannot be sufficiently decreased.

SUMMARY OF THE INVENTION

The present invention has been accomplished with the above circumstance in view, and it is an object of the present invention to decrease the pressure loss in a blade of an axial-flow rotary fluid machine used mainly in a transonic range.

In order to achieve the above-mentioned object, according to a first feature of the invention, there is provided a blade of an axial-flow rotary fluid machine, comprising: an intrados adapted to generate a positive pressure between a leading edge and a trailing edge; and an extrados adapted to generate a negative pressure between the leading edge and the trailing edge, wherein a camber line in the trailing edge includes a first bent portion bent toward the intrados, and a second bent portion located in the rear of said first bent portion and bent toward the extrados, said second bent portion having a curvature decreased from the side of a blade root toward a blade tip.

According to a second feature of the invention, in addition to the first feature, when positions along the camber line are represented in such a manner that the position of the leading edge is represented by a 0% position, and the position of the trailing edge is represented by a 100% position, the position of the first bent portion is in the rear of a 90% position, and the inclination of the camber line immediately in the rear of the second bent portion at least in the blade root is substantially equal to the inclination of the camber line immediately in front of the first bent portion.

According to a third feature of the invention, in addition to the first feature, the blade has one inflection point on the intrados in the vicinity of the trailing edge, and two or more inflection points on the intrados in front of the one inflection point.

With the above arrangement, the front first bent portion bent toward the intrados and the rear second bent portion bent toward the extrados are provided on the camber line on the trailing edge of the blade of the axial-flow rotary fluid machine, and the curvature of the second bent portion is decreased from the side of the blade root toward the blade tip. Therefore, a higher-pressure portion on the intrados which is a pressure surface of the blade is displaced toward the trailing edge, so that a secondary flow from the side of the blade tip toward the blade root can be suppressed, whereby a pressure loss particularly in the vicinity of the blade root can be suppressed to the minimum.

The above and other objects, features and advantages of the invention will become apparent from the following description of the preferred embodiment taken in conjunction with the accompanying drawings.

An embodiment of the present invention will be described with reference to the accompanying drawings. In the drawings, "X" represents an axial position, "Cax" represents an axial blade chord length, and "rθ" represents a circumferential position.

BRIEF DESCRIPTION OF THE DRAWINGS

FIG. 8 is a graph showing distributions of isentropic Mach numbers in a chord direction in the turbine blade in the comparative example.

FIG. 9 is a graph showing distributions of isentropic Mach numbers in a chord direction in the turbine blade in the embodiment.

FIG. 10 is a graph showing distributions of normalized accumulated-entropies in the chord direction in the comparative example and the embodiment.

DETAILED DESCRIPTION OF THE PREFERRED EMBODIMENT

Figure 1:
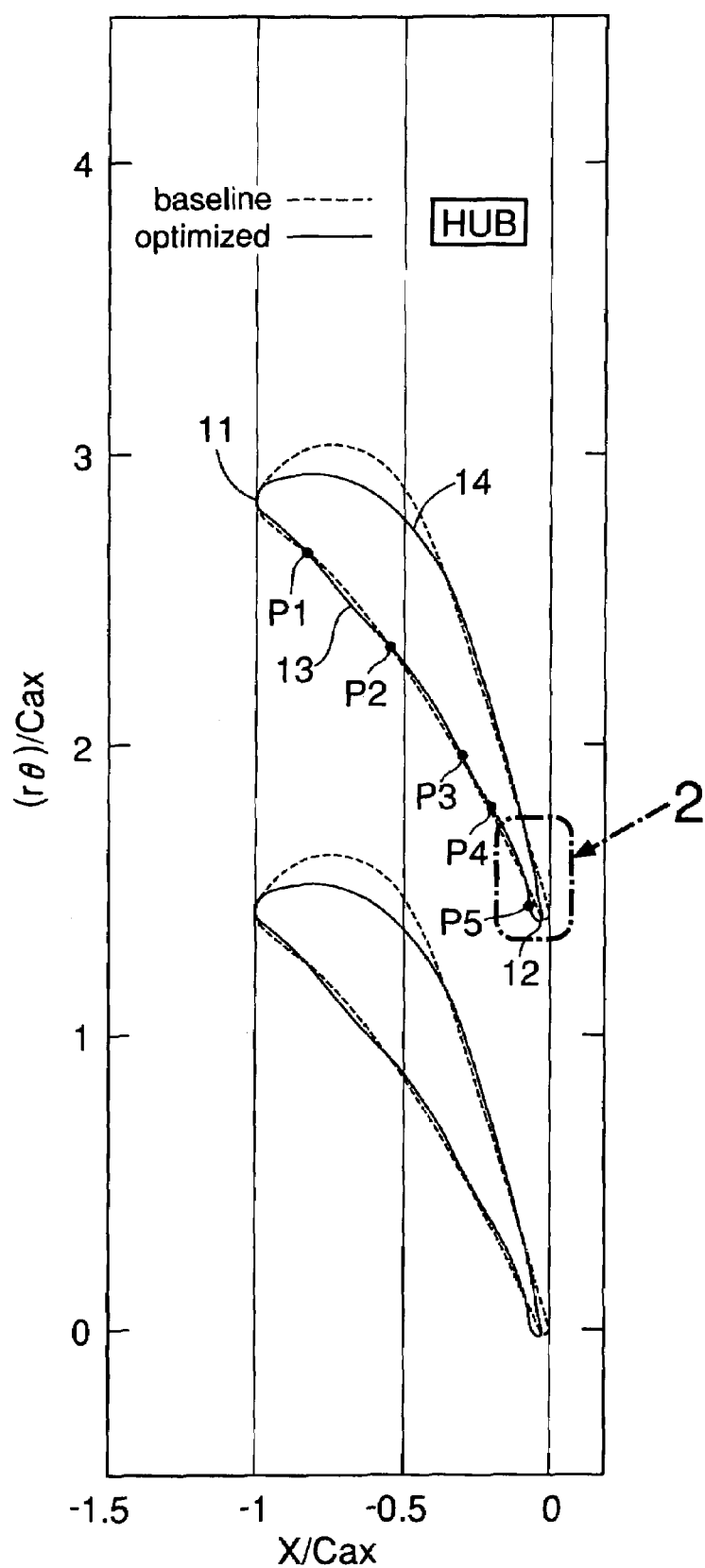
FIG. 1 is a diagram showing airfoils of blade roots of turbine blades according to a comparative example and an embodiment.
Figure 4:
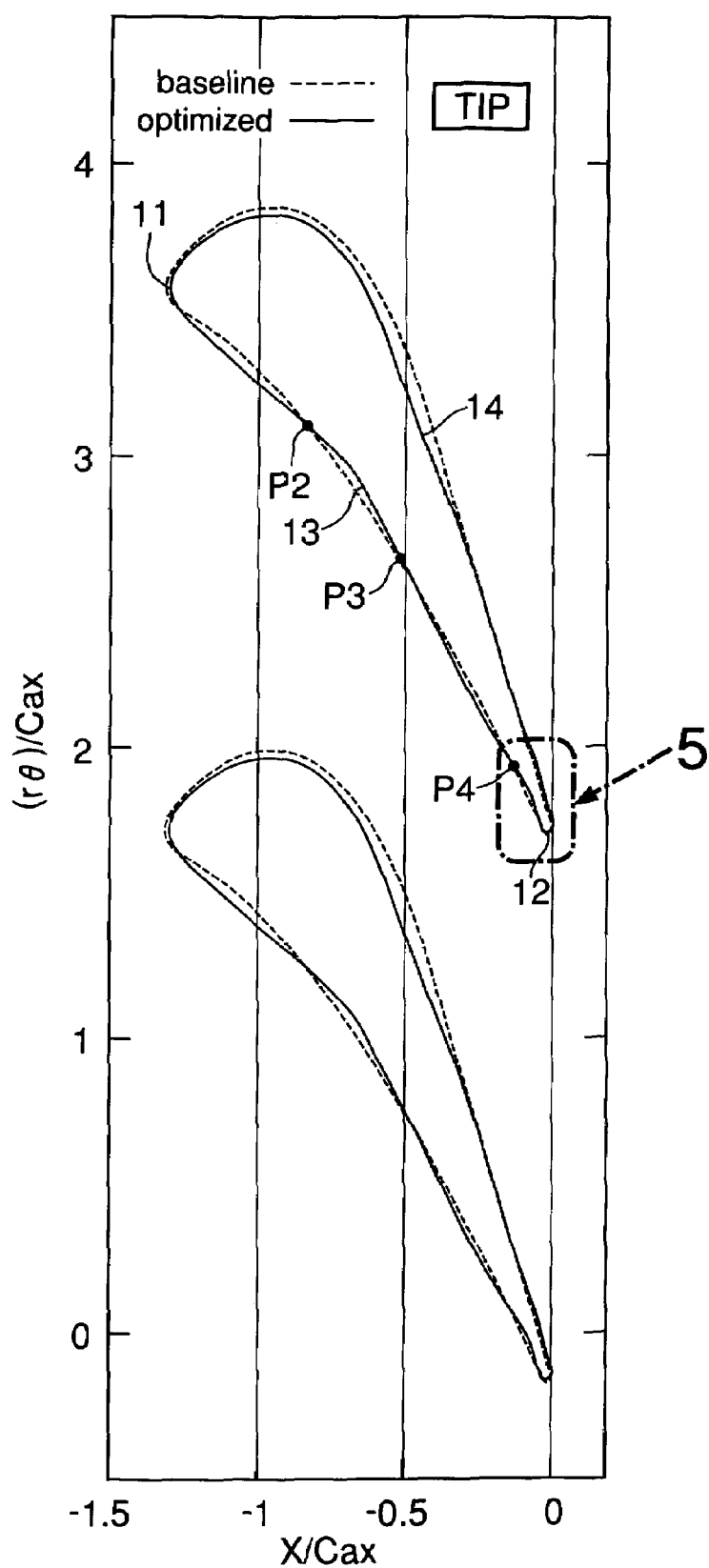
FIG. 4 is a diagram showing airfoils of blade tips of the turbine blades according to the comparative example and the embodiment.

Turbine blades according to the present embodiment are disposed in an annular gas passage in an axial-flow turbine to constitute a turbine blade cascade. An airfoil shown in FIG. 1 is of a blade root (a portion connected to a hub) at a radial inner end of a turbine stator blade, and an airfoil shown in FIG. 4 is of a blade tip at a radial outer end of the turbine stator blade. The airfoil of the turbine blade is changed progressively from the blade root toward the blade tip. As apparent from FIG. 7B, the three-dimensional shape of the turbine blade has an ultra-low aspect ratio with a span length longer than a chord length.

In the airfoil of the blade root shown in FIG. 1, a broken line shows an airfoil (a baseline) in a comparative example, which is a basis, and a solid line shows an airfoil (optimized) in the embodiment, which is optimized on the basis of the comparative example. The airfoil in the embodiment includes an intrados 13 (a positive pressure surface) adapted to generate a positive pressure with flowing of a fluid, and an extrados 14 (a negative pressure surface) adapted to generate a negative pressure with flowing of the fluid, between a leading edge 11 at a left end and a trailing edge 12 at a right end.

As apparent from the comparison between the embodiment and the comparative example, the airfoil in the embodiment has a blade thickness in the vicinity of the leading edge 11, which is smaller than that of the airfoil in the comparative example, and the airfoil in the embodiment has an S-shaped curved portion in the vicinity of the trailing edge 12, which is not present in the comparative example. An intrados 13 of the airfoil in the comparative example is of a simple concave shape, while five inflection points P1 to P5 are present in an order from the leading edge 11 toward the trailing edge 12 in the intrados 13 of the airfoil in the embodiment. The curvature at each of the inflection points P1, P3 and P5 is changed from the concave to the convex in a direction of flowing of a gas, and the curvature at each of the inflection points P2 and P4 is changed from the convex to the concave in the direction of flowing of the gas.

Figure 2:
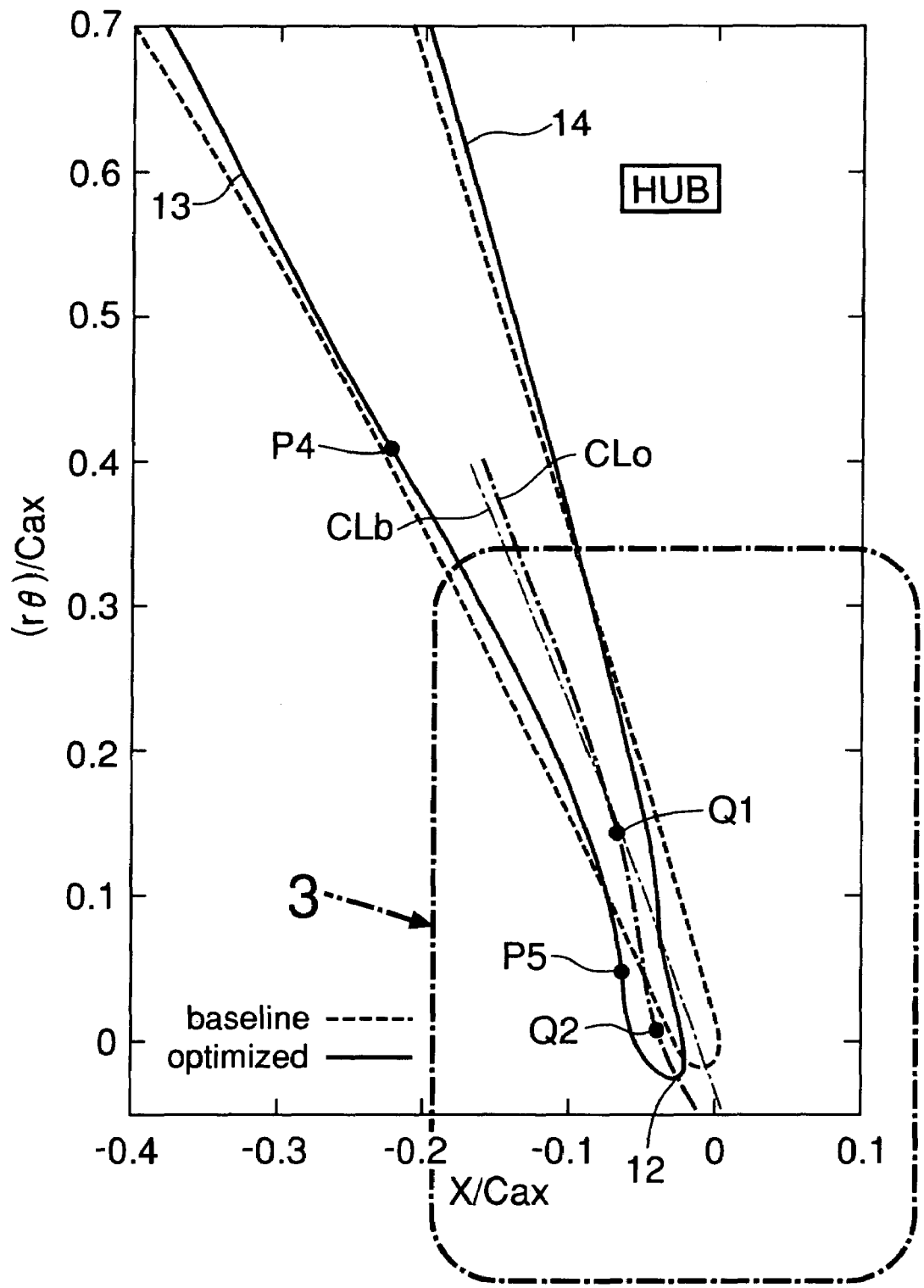
FIG. 2 is an enlarged diagram of Area 2 in FIG. 1.
Figure 3:
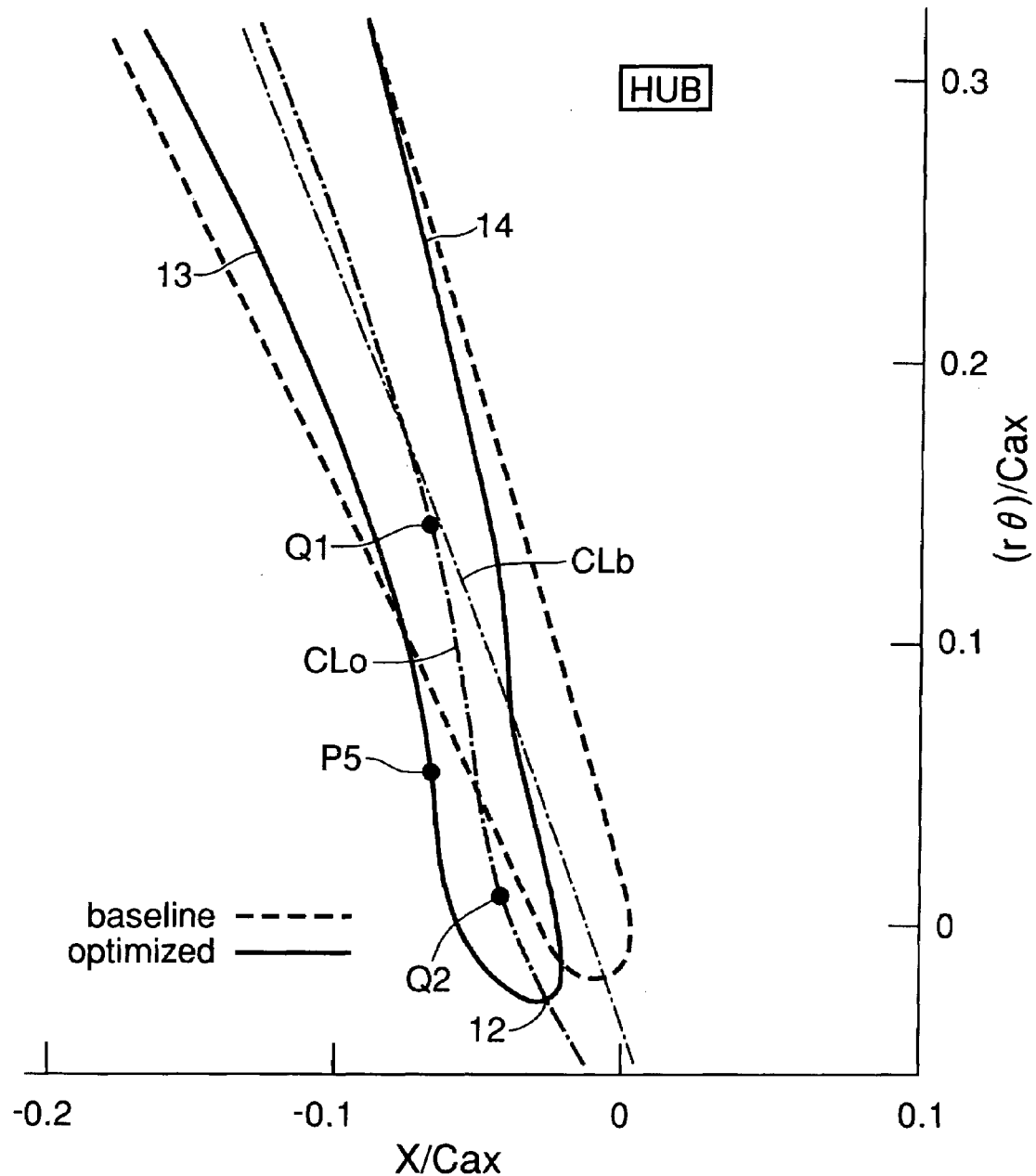
FIG. 3 is an enlarged diagram of Area 3 in FIG. 2.

FIGS. 2 and 3 show enlarged shapes of the airfoils in the vicinity of the trailing edge 12, in which the airfoil in the embodiment has a remarkable characteristic. A camber line CLb of the airfoil in the comparative example is substantially rectilinear, while a camber line CLo of the airfoil in the embodiment is curved in an S-shape, and hence two bent portions Q1 and Q2 are present on the camber line CLo in the trailing edge 12. The front first bent portion Q1 is curved toward the intrados 13 at its downstream side in the direction of flowing of the fluid, and the rear second bent portion Q2 is curved toward the extrados 14 at its downstream side in the direction of flowing of the fluid. The positions of the first and second bent portions Q1 and Q2 exist in the rear of 90% of the chord length. In the camber line CLo of the airfoil in the embodiment, the inclination of a section in front of the first bent portion Q1 and the inclination of a section in the rear of the second bent portion Q2 are substantially parallel to each other by the virtue of the above-described S-shaped curving, whereby the angle of flowing of the fluid from the trailing edge 12 is adjusted. Between the first and second bent portions Q1 and Q2, there is a section having a blade thickness partially smaller than those of sections in front of and in the rear of the bent portions Q1 and Q2, respectively.

Figure 5:
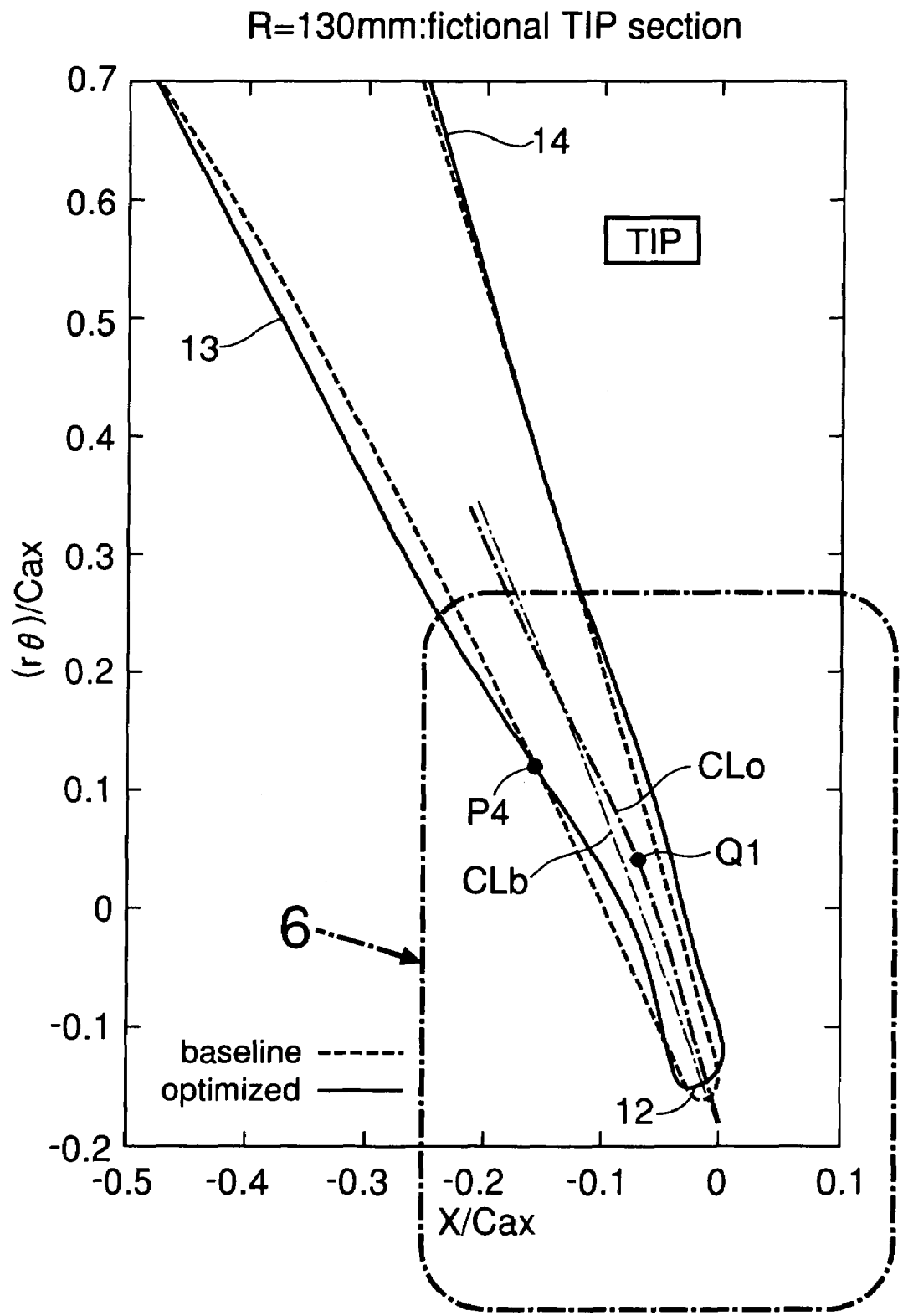
FIG. 5 is an enlarged diagram of Area 5 in FIG. 4.
Figure 6:
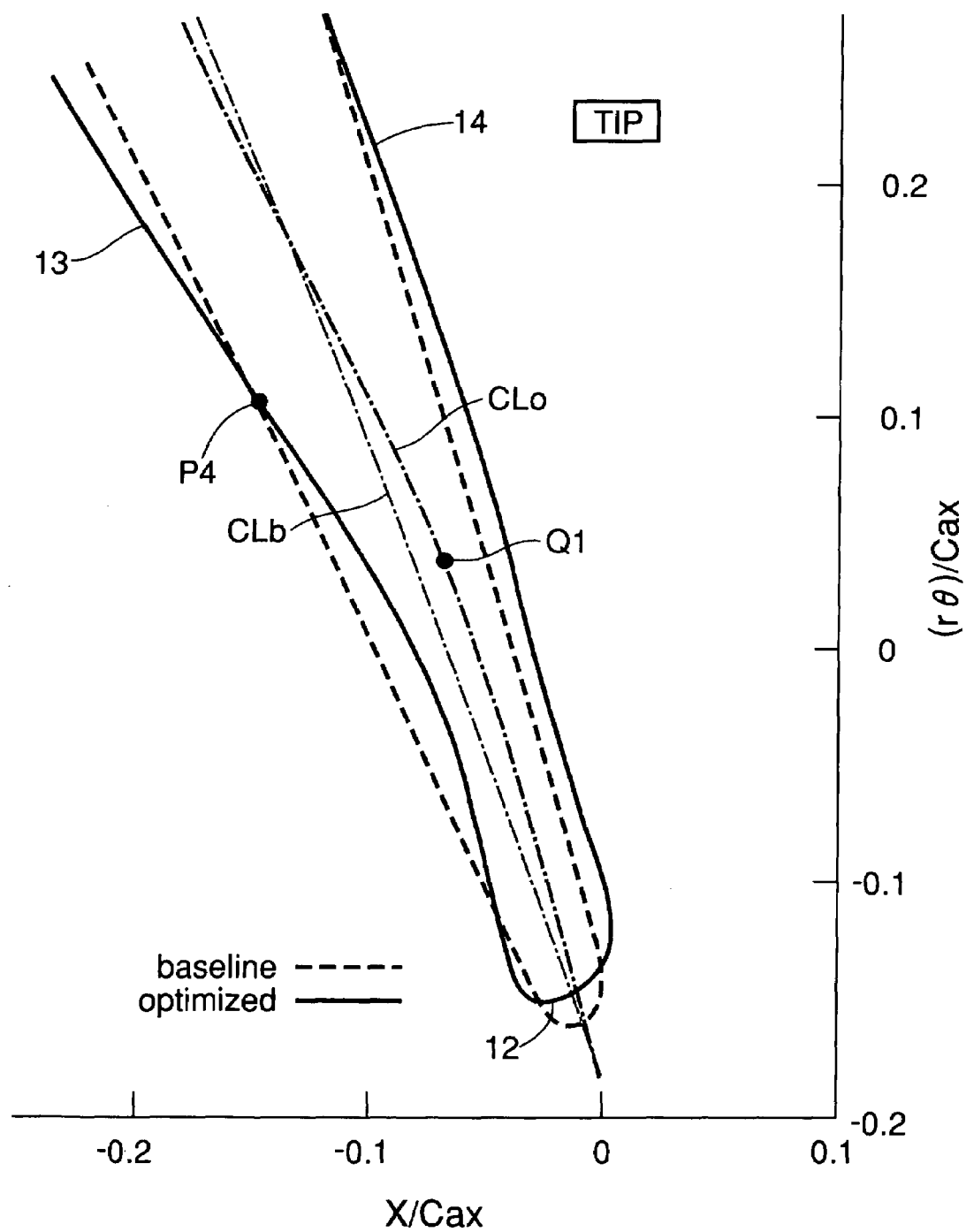
FIG. 6 is an enlarged diagram of Area 6 in FIG. 5.

An airfoil of the blade tip shown in FIGS. 4 to 6 is changed progressively from the airfoil of the blade root described with reference to FIGS. 1 to 3. The shape of the intrados 13 and the shape of the camber line CLo basically take over the feature of the airfoil of the blade root, but are slightly different in the following point: the intrados 13 of the airfoil of the blade root includes the five inflection points P1 to P5 (see FIG. 1), but in the intrados 13 of the airfoil of the blade tip, the inflection point P1 closest to the leading edge 11 and the inflection point P5 closest to the trailing edge 12 are vanished (see FIG. 4). The camber line CLo of the airfoil of the blade root is curved in an S-shape including first and second bent portions Q1 and Q2 (see FIG. 1), but in the camber line CLo of the airfoil of the blade tip, the second bent portion Q2 closer to the trailing edge 12 is vanished (see FIG. 5).

However, the vanishing of the two inflection points P1 and P5 and the second bent portion Q2 occurs in the airfoil of the blade tip, and the two inflection points P1 and P5 and the second bent portion Q2 are present without being vanished in a position slightly displaced from the blade tip toward the blade root. As for the second bent portion Q2, its curvature is gradually decreased from a predetermined value at the blade root to zero at the blade tip.

Figure 7A:
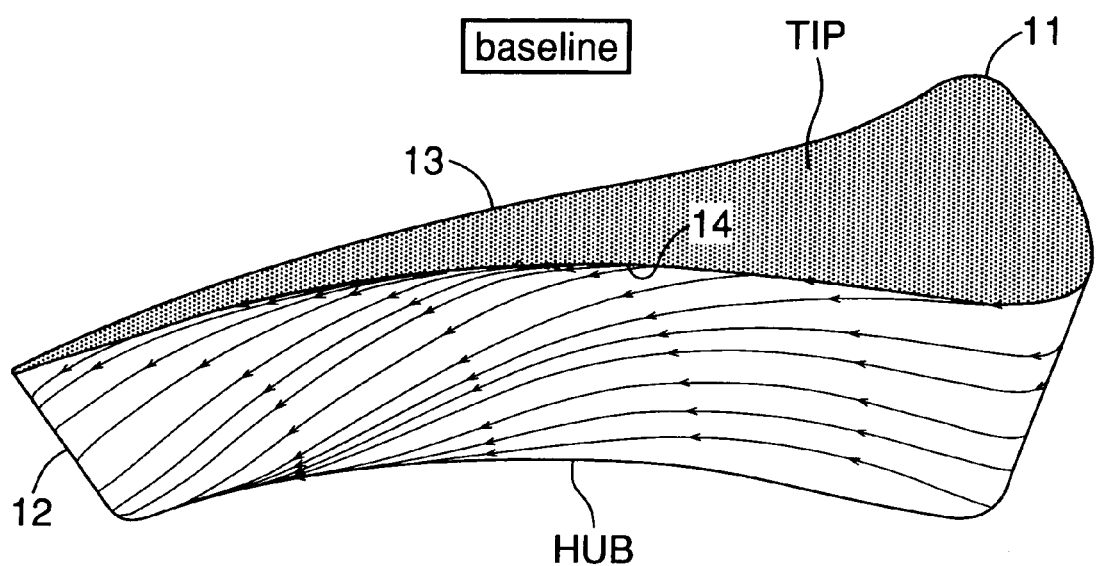
FIG. 7A is a diagram showing flow lines along a surface of the turbine blade in the comparative example.
Figure 7B:
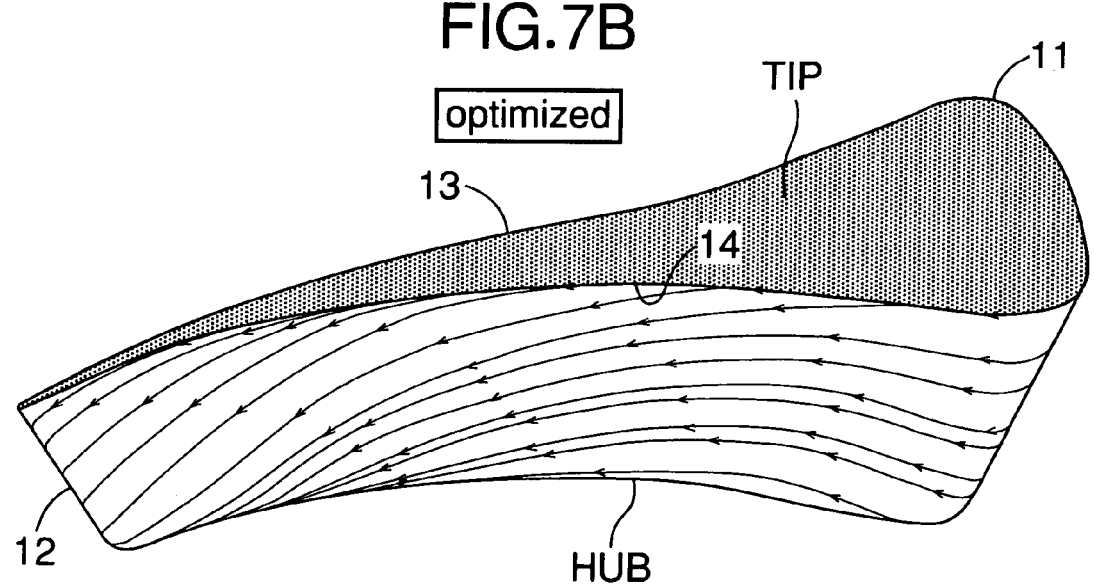
FIG. 7B is a diagram showing flow lines along a surface of the turbine blade in the embodiment.

It is known that a secondary flow in a direction from the blade tip toward the blade root is generally present on a surface of a turbine blade (particularly, on the intrados 13), and a pressure loss is generated due to the secondary flow to degrade the performance of the turbine blade. FIGS. 7A and 7B show flows of a fluid along a surface of a turbine blade, wherein FIG. 7A corresponds to the comparative example, and FIG. 7B corresponds to the embodiment. Secondary flows in a direction from the blade tip toward the blade root are present in both the comparative example and the embodiment. It can be seen in the embodiment that the inclination of flow lines is smaller with respective to a flowing direction of a main flow, and the amount of the secondary flows toward the blade root is decreased. The decrease in the amount of the secondary flows is realized mainly by the first and second bent portions Q1 and Q2 provided in the vicinity of the trailing edge 12 of the intrados 13.

FIGS. 8 and 9 show distributions of isentropic Mach numbers in chord directions on the intrados 13 (PS) and the extrados 14 (SS), wherein FIG. 8 corresponds to the comparative example, and FIG. 9 corresponds to the embodiment. A thick line and a thin line correspond to distributions of speeds on the side of the intrados 13 and on the side of the extrados 14, respectively; a solid line corresponds to the blade root (a 100% position in a span direction; a broken line corresponds to an intermediate portion (a 50% position in the span direction); and a dashed line corresponds to the blade tip (a 90% position in the span direction).

Referring carefully to the distributions of pressures (see the thick lines) on the side of the intrados 13 in the comparative example and the embodiment, in the embodiment, a section with the higher pressure (a section with the lower Mach number) is displaced significantly toward the trailing edge 12 as compared with the comparative example, and the Mach number steeply rises in the vicinity of the trailing edge 12. The characteristic distribution of pressure in the embodiment is attributable to the presence of the first and second bent portions Q1 and Q2 in the vicinity of the trailing edge 12, and the secondary flow from the blade tip toward the blade root on the intrados 13 of the turbine blade is suppressed by this distribution of pressure.

FIG. 10 shows a distribution of normalized accumulated-entropy in a chord direction from a 0% position (the blade root) to a 50% position (the intermediate portion) in the span direction of the turbine blade, wherein a broken line and a solid line correspond to the comparative example and the embodiment, respectively. As apparent from FIG. 10, it can be seen that the normalized accumulated-entropy in the embodiment is decreased remarkably in the rear of −1.0 in the X-abscissa in the chord direction more than that in the comparative example. This is considered to be because the secondary flow from the blade tip toward the blade root is suppressed in a region from the chord-wise intermediate portion to the trailing edge 12 of the intrados 13 of the turbine blade.

Figure 11:
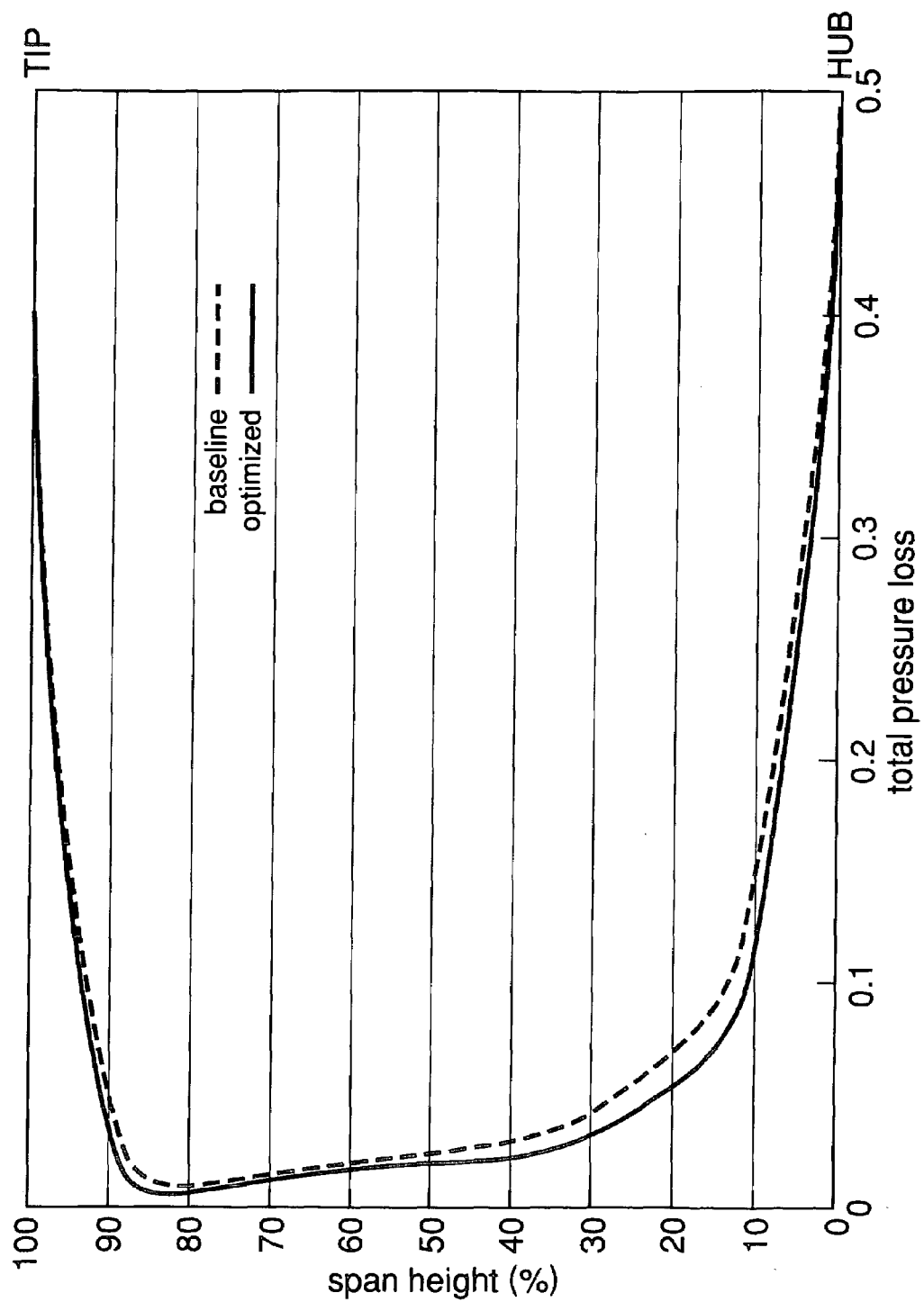
FIG. 11 is a graph showing distributions of total pressure losses in a span direction in the comparative example and the embodiment.

FIG. 11 shows a distribution of total pressure loss in the span direction, wherein a broken line and a solid line correspond to the comparative example and the embodiment, respectively. As apparent from FIG. 11, it can be seen that the total pressure loss in the embodiment is lower than that in the comparative example mainly in a region from the span-wise intermediate portion to the blade root.

Although the embodiment of the present invention has been described in detail, various modifications in design may be made without departing from the subject matter of the invention.

For example, the blade according to the present invention is not limited to the turbine blade in the embodiment, and also applicable to a compressor blade.

What is claimed is:

1. A blade for an axial-flow rotary fluid machine, the blade comprising:
   an intrados configured to generate a positive pressure between a leading edge and a trailing edge; and
   an extrados configured to generate a negative pressure between the leading edge and the trailing edge,
   wherein a camber line in the trailing edge at a rear half of the blade includes a first bent portion configured to bend the camber line toward the intrados at a downstream side thereof in a direction of flowing of a fluid, and a second bent portion which is located in the rear of said first bent portion and is configured to bend the camber line toward the extrados at a downstream side thereof in the direction of flowing of the fluid, said second bent portion having a curvature decreased from the side of a blade root toward a blade tip.

2. A blade for an axial-flow rotary fluid machine according to claim 1, wherein when positions along the camber line are represented in such a manner that a position of the leading edge is represented by a 0% position, a position of the trailing edge is represented by a 100% position, and a position of the first bent portion is in a rear of a 90% position, and the an inclination of the camber line immediately in the rear of the second bent portion at least in the blade root is substantially equal to the inclination of the camber line immediately in front of the first bent portion.

3. A blade for an axial-flow rotary fluid machine according to claim 1, wherein the blade has one inflection point on the intrados in the vicinity of the trailing edge, and two or more inflection points on the intrados in front of the one inflection point.

4. A blade for an axial-flow rotary fluid machine according to claim 1, wherein the curvature of the second bent portion is decreased from the side of the blade root toward the blade tip such that a blade tip camber line in the trailing edge is bent only towards the intrados.

5. A blade for an axial-flow rotary fluid machine, the blade comprising:
   an intrados configured to generate a positive pressure between a leading edge and a trailing edge of the blade; and
   an extrados configured to generate a negative pressure between the leading edge and the trailing edge,
   wherein a camber line in the trailing edge at a rear half of the blade includes a first curve and a second curve which are curved in opposite directions to each other, the first curve being directed toward the extrados and the second curve being located downstream of said first curve in the direction of flowing of a fluid and directed toward the intrados, said second curve having a curvature decreased from the side of a blade root towards a blade tip of the blade.

6. A blade for an axial-flow rotary fluid machine according to claim 5, wherein when positions on the blade along the camber line are represented such that the position of the leading edge is represented by a 0% position and the position of the trailing edge is represented by a 100% position, the position of the first curve is in the rear of a 90% position of the blade.

7. A blade for an axial-flow rotary fluid machine according to claim 5, wherein the curvature of the second curve is vanished at the blade tip.

* * * * *